United States Patent
Hampton

(10) Patent No.: US 10,029,420 B1
(45) Date of Patent: Jul. 24, 2018

(54) METHOD OF OPERATING A THREE-DIMENSIONAL PRINTER

(71) Applicant: Daniel Hampton, Lupton City, TN (US)

(72) Inventor: Daniel Hampton, Lupton City, TN (US)

(73) Assignee: 3D Operations, Inc., Chattanooga, TN (US)

( * ) Notice: Subject to any disclaimer, the term of this patent is extended or adjusted under 35 U.S.C. 154(b) by 233 days.

(21) Appl. No.: 14/833,193

(22) Filed: Aug. 24, 2015

Related U.S. Application Data

(60) Provisional application No. 62/041,340, filed on Aug. 25, 2014.

(51) Int. Cl.
| | |
|---|---|
| G05B 19/4099 | (2006.01) |
| G06F 17/50 | (2006.01) |
| B29C 67/00 | (2017.01) |
| B29C 64/112 | (2017.01) |
| B29C 64/106 | (2017.01) |
| B29C 64/10 | (2017.01) |
| B29C 64/393 | (2017.01) |
| B29C 64/118 | (2017.01) |
| B29C 64/386 | (2017.01) |
| B33Y 10/00 | (2015.01) |

(Continued)

(52) U.S. Cl.
CPC .......... *B29C 67/0088* (2013.01); *B29C 64/10* (2017.08); *B29C 64/106* (2017.08); *B29C 64/112* (2017.08); *B29C 64/118* (2017.08); *B29C 64/386* (2017.08); *B29C 64/393* (2017.08); *B29L 2031/7532* (2013.01); *B33Y 10/00* (2014.12); *B33Y 50/02* (2014.12); *G06T 2207/10072* (2013.01); *G06T 2207/10081* (2013.01); *G06T 2207/10088* (2013.01); *G06T 2207/10104* (2013.01)

(58) Field of Classification Search
CPC ..... B29C 64/10; B29C 64/106; B29C 64/112; B29C 64/118; B29C 64/386; B29C 64/393; B33Y 10/00; B33Y 50/00; B33Y 50/02; G05B 19/4099; G06F 17/50; G06F 19/32; G06F 19/321; G06F 19/34; G06F 19/3418; G06F 19/3437; G06T 2207/10072; G06T 2207/10081; G06T 2207/10088; G06T 2207/10104
USPC ....... 264/40.1, 308; 382/128, 131, 132, 173; 700/118, 119; 703/6, 11
See application file for complete search history.

(56) References Cited

U.S. PATENT DOCUMENTS

| | | | | |
|---|---|---|---|---|
| 6,112,109 | A * | 8/2000 | D'Urso ............. | G05B 19/4099 128/898 |
| 2002/0059049 | A1* | 5/2002 | Bradbury .......... | G05B 19/4099 703/11 |

(Continued)

*Primary Examiner* — Leo B Tentoni
(74) *Attorney, Agent, or Firm* — Miller & Martin, PLLC

(57) ABSTRACT

Three dimensional printing improvement includes an ability to automatedly segment sections of scans to provide at least one virtual solid for printing in layers. The printing can be performed remotely, such as at a location near a doctor, for rapid turn-around. Automated segmenting can include use of a protocol that may include at least a portion of a segmented solid for rapidly segmenting the scanned sections. When making solids, a first solid can be generated and sent to the printer before beginning work on creating a second solid.

19 Claims, 6 Drawing Sheets

(51) Int. Cl.
*B33Y 50/02* (2015.01)
*B29L 31/00* (2006.01)

(56) References Cited

U.S. PATENT DOCUMENTS

| | | | |
|---|---|---|---|
| 2007/0081744 A1* | 4/2007 | Gokturk | G06F 17/30253 382/305 |
| 2010/0329530 A1* | 12/2010 | Lang | A61F 2/30942 382/131 |
| 2012/0100500 A1* | 4/2012 | Gao | B33Y 50/00 703/11 X |
| 2013/0085736 A1* | 4/2013 | Reihsen | G06F 19/3437 703/11 |
| 2014/0277659 A1* | 9/2014 | Kumar | G05B 19/4097 700/97 |

* cited by examiner

METHOD OF OPERATING A THREE-DIMENSIONAL PRINTER

CLAIM OF PRIORITY

This application claims the benefit of U.S. Provisional Patent Application No. 62/041,340 filed Aug. 25, 2014 which is incorporated herein by reference in its entirety.

FIELD OF THE INVENTION

The present invention relates to three dimensional printers and their modes of operation, and more particularly such uses in the health care field.

BACKGROUND OF THE INVENTION

Three dimensional printers have been in existence for over a decade. However, as it relates to the health care industry, three dimensional printing is not a wide spread art.

For instance, if a doctor wants a three dimensional image of a patient's actual knee or shoulder made, it is likely that they would have to take a scan, send the scan off to a remote location, wait weeks, if not months, and then receive a print (3d model) back. By then, there may be a significant change in the body of the patient.

Additionally, in addition to hard tissue such as bone, there is believed to be a need to print other tissues with three dimensional printers, such as internal organs, i.e., the heart, liver, colon, pancreas, etc., or even a hard bone with more flexible tendons, cartilage, etc.

When printing three dimensional models, normally an entire file is taken and then segmented by the software of the printer or a computer connected to the printer for each layer to be printed. This requires the uploading or generation of an entire file processing by the computer (or printer) and then outputting specific layers to the printer for printing one layer at a time. An increased efficiency method is believed to be desirable for at least some applications.

Additionally, there is no current way for doctors to quickly receive models of patients, organs, bones or other structure as would otherwise be interpreted by a scan such as CT scan or MRI or other scan so that representative components can be printed locally such as either at a central office in a city and delivered to the doctor or in the doctor's office and/or at a hospital so that the doctor then can show the patient and/or come up with a preferred course of action to address any particular issue possibly in the same visit as the scan is performed.

Finally, even though the relative shape of many internal body parts is relatively similar amongst one individual and another, there is no known way to provide a three dimensional printed object based at least partially on a model of common traits amongst multiple individuals that is utilized to assist in preparing a file for printing. Accordingly, there is believed to be a series of needs at least in the health care profession if not others for an improved three dimensional printer and methods of operating three dimensional printers.

SUMMARY OF THE INVENTION

It is the present object of many embodiments of the present invention to provide an improved method of printing with a three dimensional printer.

It is another object of many embodiments of the present invention to provide an improved three dimensional modeling for use with printing.

It is another object of many embodiments of the present invention to provide an improved method of printing three dimensional objects remotely.

Accordingly, in accordance with at least some presently preferred embodiments of the present invention, a three dimensional printer can be provided remotely such as in a doctor's office, at a hospital, or even in a facility proximate to at least one hospital so that at a scan of an internal part of the patient can be made, sent and processed (possibly remotely) to be then generated into a three dimensional solid (or files of solid) file and then printed as 3d prints, preferably proximate to the patient in a quick time frame such as that same day which is drastically more efficient than the weeks, if not months, that it currently takes to receive the shipped model from another source.

Furthermore, in order to expedite the speed, it may be possible that as the scanner is scanning each individual layer is sent to a computer whereby at least two successive layers are integrated by the software to then develop a print profile or solid for a layer of a three dimensional model so that once at least the thickness of the three dimensional printer layer is received and segmented by at least two successive scans, the print cycle can begin at the printer before waiting for the complete three dimensional virtual model to be created by the software which is the current standard utilized to print three dimensional models in all fields for at least some embodiments.

Finally, for at least some embodiments, a representative three dimensional virtual model of a portion of an anatomy of a person such as a liver, a pancreas, a shoulder, a knee or other portion of the individual can be stored as a model file or protocol with segmentation to which data from an individual patient can then be combined therewith to greatly increase the speed of generating a virtual model of the actual patient's anatomy based in a large part on the existing anatomy protocol provided by the system. Furthermore, it may be possible as each individual's data is received that the overall file for the protocol model may be enhanced and/or updated.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
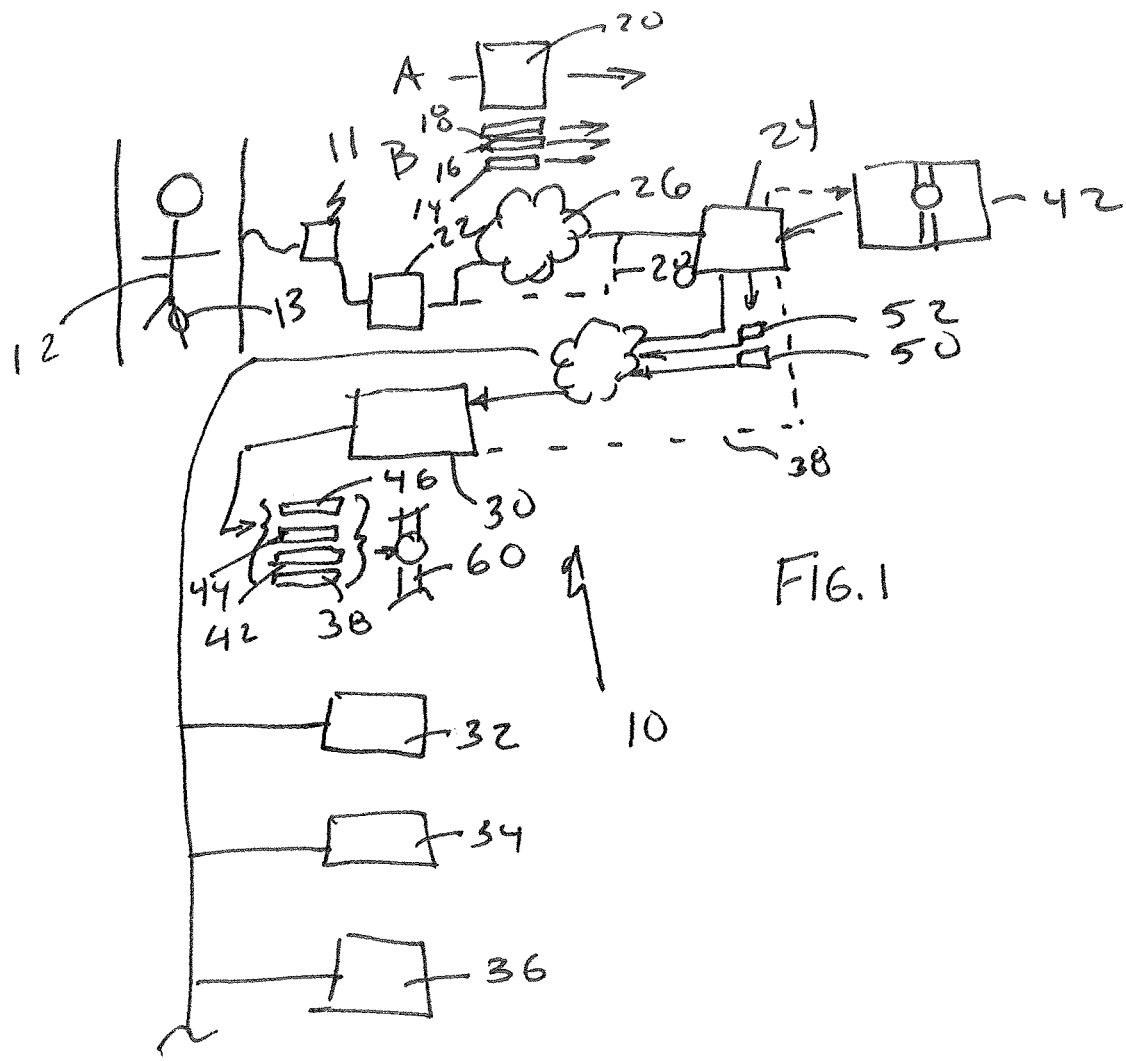
FIG. 1 is a schematic view of a presently preferred method of providing various embodiments of the presently preferred invention.

FIG. 1 shows a system 10 and methods of operation of a presently preferred embodiment of the present invention.

Specifically, a scan with a scanner 11 is made of at least a portion of a person 12, such as of a knee 13. It will be understood by those of ordinary skill in the art that various scans such as X-rays, MRI's, CT or CAT scans, PET scans and/or others can be undertaken with various scanners 11. Many of these scans, particularly the MRI's and CT scans can output "slices" of sections 14,16,18 of the portion of the body scanned. Other scanners may make a complete file 20 of the scanned body part.

The sections 14,16,18 and/or file 20 can be sent via computer, modem, wire, or other transmitter 22 either directly through wire, either locally, or remotely to computer 24. Cloud 26 represents the world wide web (and/or wireless transmission), while dotted line 28 represents an alternatively preferred wired method.

Figure 2:
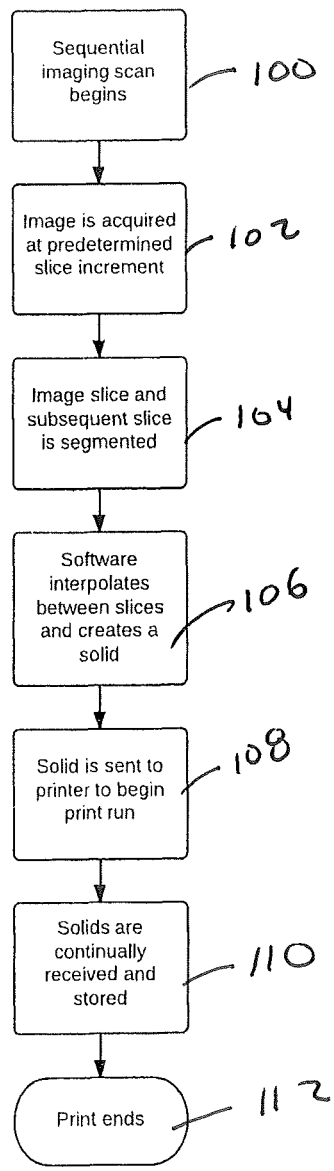
FIG. 2 is a flow chart showing the presently preferred embodiment of the present invention for improved rapid printing of partial models in slice format.
Figure 3:
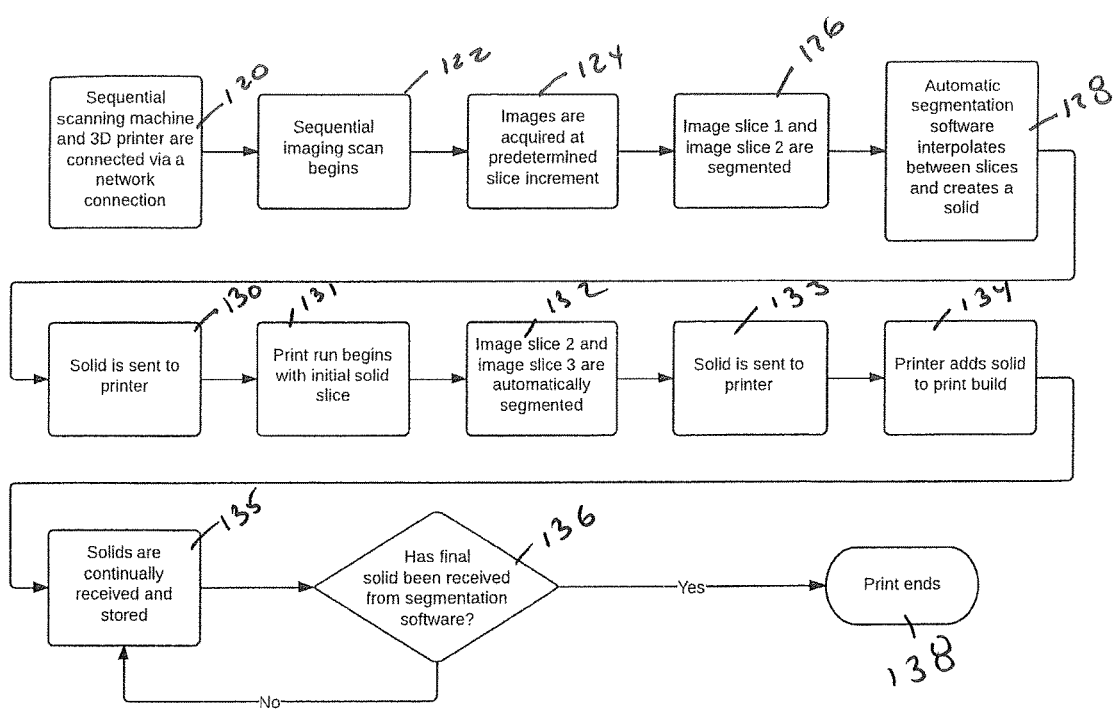
FIG. 3 is a flow chart showing more detail of FIG. 2.

If sections 14,16,18 are sent to the computer 24, for at least some embodiments, as explained with reference to FIGS. 2 and 3, the sequential scan begins at step 100 (or 122 in FIG. 3). FIG. 3 has step 120 before step 122 which includes the step of connecting a 3D printer (such as one of 30,32,34,36 or others with reference to FIG. 1, as will be explained in further detail below) to a scanning machine or scanner 11, such as through transmitter 22, through a network connection which could be hard wired such as with wires 28,38 (shown in dotted lines as an alternatively preferred embodiment). Computer 24 is preferably in the linkage between the scanner 11 and the 3D printer 30,32, 34,36, but need not necessarily be, particularly if the technology continues to evolve over time.

With many scanners 11, such as MRI's (Magnetic Resonance Imaging Machines), CT or CAT Scans (computerized axial tomography), PET scans positron emission tomography, images are acquired at a preselected slice increment of 0.75 mm, 1 mm, 1.5 mm, 2 mm, 2.5 mm, 3 mm, 4 mm, 5 mm, 6 mm, 7 mm, 8 mm, or 10 mm for at least some embodiments, other embodiments may have other slice widths to provide sections 14,16,18. Sections 14,16,18 are two dimensional representations. The sections 14,16,18, have a predetermined slice increment as is shown in step 102 and 124.

Segmentation of all of the slices 14,16,18 (and the others associated with the scan of a particular individual 12) have been performed manually (i.e, by a person) to provide virtual three dimensional models of body parts in the past. These virtual three dimensional models have been printed as objects, but the process to segment the slices by an operator has been found to take a skilled operator about thirty minutes to provide the three dimensional model. Segmentation is the process dividing an image into regions with similar properties such as gray level, color, texture, brightness, and contrast. With the portions "segmented" into component parts, then when an adjacent layer is similarly segmented, common parts can be printed together.

What the applicant has done, for at least some embodiments is to take at least two adjacent slices and automatedly segment with the computer 24 with an algorithm. In order to achieve repeatable results, the applicant has devised a protocol of settings for a particular scanner 11, so that the properties as described above relative to segmentation as outputs can be analyzed by the computer 24 to automatedly assign commonalities (and remove background noise) so that the human anatomy, possibly together with pathogens, such as cancers, can be printed out in three dimensions with at least one of the printers 30,32,34,36 in layers 38,40 having a predetermined thickness, such as 0.1 mm, 0.25 mm or whatever the print thickness of the printer 30,32,34,36 provides.

Furthermore, in at least some embodiments, a first slice, such as 14 is segmented with a second slice, such as 16 (it being understood that any adjacent slices could be first and second slices) at step 104 and 126), and instead of waiting for the entire file 20 to be created, together with the segmentation, the computer 24 assimilates the sections 14,16 together as a portion of a virtual 3D model (step 106, 128), hereinafter referred to as solid, possibly in combination with a stored protocol 42, and then the printer 11 (or the computer 22) assigns at least a first layer 38 for printing so that a first layer 38 can be printed based on just the receipt of first and second sections 14,16 without waiting for a third 18 or subsequent sections to be provided (see step 108, 130, 131). Of course some embodiments (depending on the thicknesses of the sections), may require three sections 14,16,18 (or even more) to be able to print a single layer such as 38, but that would appear to be unlikely for at least some embodiments.

With the first layer printed, such as layer 38, then it may be that a second layer 40 is printed using the information obtained from the first and second sections 14,16 (i.e., the first solid 50), or it may be that second and third sections 16,18 are required to provide the data to the computer 24 for directing the printing of the second layer 40 and/or the sending of a second solid. Once sufficient data has arrived, without waiting for the entire virtual model 20 to be provided, the second layer 40 is printed. While it may be possible that the ability to scan at the scanner 11 and provide information to the computer 24 is faster than the ability to print (or not), it may be that the printer 24 continually receives and provides print commands to a printer 30,32, 34,36 as each layer 38,40, etc. are finished. Upon completion of segmentation and assimilation of the various sections 14,16,18 and likely others, for the entire scanned part, such as knee 13 or other part, the print can end at step 112.

FIG. 3 may show this process more clearly for at least some embodiments with the printer 11 being provided with an instruction to print at least a layer of a solid at step 130, which could include a first slice (or layer) at step 131. Sections 16,18, etc. could then be automatedly segmented, by computer 24 with another solid being sent to printer 133 which could then add another layer at step 134. Printer 30,32,34,36 could store solids, and then direct the printing of slices or layers 40,46,48 (at step 135) or determine what is printed in layers 40,46,48 after receiving the solid files from the computer 22.

Once the final solid has been received from the computer 22, the print can end at step 138 with the printing of the final layer 48 or other layer. Other embodiments may include different and/or other elements.

Still other embodiments may allow for the use of a first section 14 to be segmented independently of having second section 16, and first section 14 could be segmented by computer 22. A first solid 50 could then be sent to printer 30,32,34,36 for printing a first layer 38. As more sections 16,18, etc. are obtained, the computer 22 could be providing second solid 52 (and subsequent solids) which could be sent to printer 30,32,34,36. Solid by solid printing by a 3D printer is believed to be novel. All prior art technologies are believed to build an entire model at the computer 22 and then send that file to a printer 30,32,34,36. The applicant believes that the improved methodology can provide faster printing of prints 60 from scans from a scanner 11 to drastically improve turn around time.

By asynchronously sending data regarding solids 50,52 to the printers 30,32,34,36 and/or others, a print (i.e., a 3D object) can be built in as close to real time as possible.

Currently, printers 30,32,34,36 are not provided in close proximity to scanners 11. Furthermore, printers 11 are rarely used with scanning machines for medical purposes. Computers 22 could be provided with printers 30,32,34,36 to customers for use locally (without transmittal through the world wide web) for at least some embodiments in an effort to dramatically speed up the production of a print 30 of a human anatomy part 13.

Figure 4:
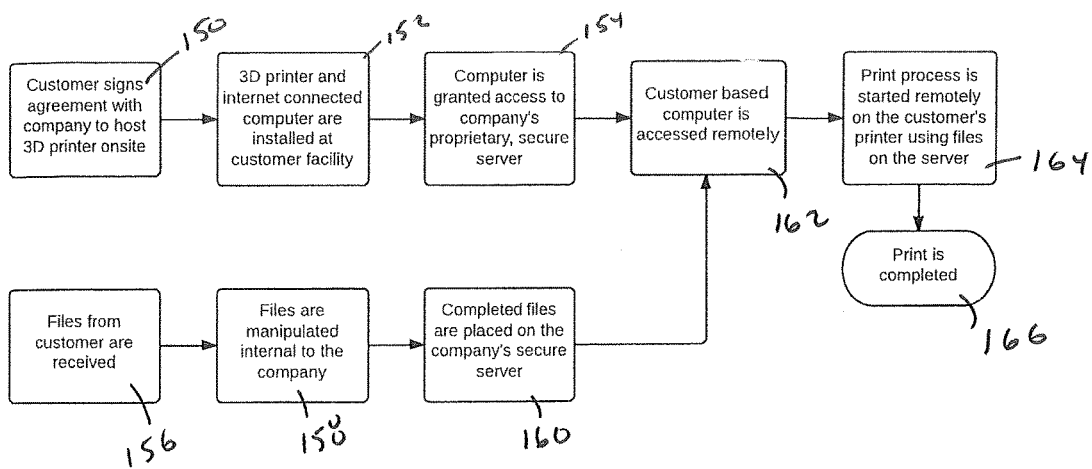
FIG. 4 is a flow chart showing the embodiment of FIG. 1 with an ability to provide three dimensional printers in a plurality of locations ready for customers' use while centrally processing files.

FIG. 4 shows still another feature of at least some preferred embodiments as reflected by FIG. 1. Specifically at step 150, a customer, such as a hospital, a doctor, a practice of doctors, a printing center, etc. signs up with the applicant to host a 3D printer such as any one of 30,32,34,36 at a specific location. Having the computer near the doctor has a lot of advantages, in that a print can be provided to the doctor in a relatively quickly fashion (hours, if not minutes, following a scan, as opposed to the weeks, if not months it takes, at best presently to be shipped from one of a very few suppliers set up to provide medical prints.

At step 152, the printer is installed at the customer facility. At step 154 the computer (any one of 30,32,34,36 or others) is provide with access to the server or computer 22. Meanwhile a scanner 11 from the customer (or from another source) such as a hospital, diagnostic facility, doctor or doctors' office can provide one or more files to the server or computer 22. The files 22 are manipulated software at the server or computer 22, possibly in combination with the protocol 42 so as to at least segment a file 20, if not also assimilate sections 14,16,18, etc. to provide at least one solid which can be stored on the files of the computer 22 (or data storage operably coupled to the computer 22). The procedure can be similar to the one described above, or the entire body part 13 could be stored as a single or multiple solids in one or more files. Using the technology described above, or not, step 162 can be performed with computer 22 accessing the printer 30,32,34,36. Operators may check over the automated procedures performed by the computer 22 before sending files to the printer(s) 30,32,34,36 in this, or even in other embodiments described herein.

The print process at printer 30,32,34,36 can be started remotely on the printers 30,32,34,36 using one or more solids 50,52 as sent from the computer 22 at step 164 until the final solid is sent and then the final layer is printed at which time the print is complete at step 166.

By having the printer 30,32,34,36 in, or close to a doctor's office or hospital, and particularly when using automated segmentation and assimilation, possibly without waiting for a complete 3D model to be created by computer 22, then a doctor may have an extremely quick turn around from taking a scan with scanner 11, to having a 3D print to examine and/or show a patient. With this technology, prints 60 could be obtained in minutes, or at least less than an hour. This is much, much faster than the current 2 week to several month process which is currently available in the market to receive a model, usually via mail, from overseas after manually segmenting a file 20.

By printing with this method, if errors in the print 60 are discovered, it may be possible for the doctor to access the computer 22 (or call to a center) so that an operator can adjust the solids 50 and/or 52 for an accurate print 60 in an extremely quick turn around time.

Figure 5:
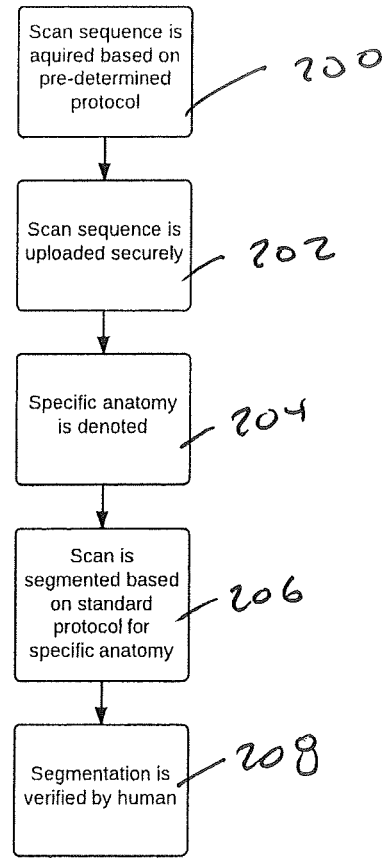
FIG. 5 is a flow chart showing a basic method of utilizing a string protocol for a specific anatomy portion.

For at least some embodiments, FIGS. 5 and/or 6 show a process of sequencing and assimilating at the computer 22 as shown in FIG. 1. Specifically step 200 a scan sequence from a scanner 11 is obtained, preferably in accordance with a pre-determined protocol. Settings on the scanner 11 will be set, or checked, as necessary so that predictable results can be obtained from the process. A scan is then undertaken by the scanner 11 and sent to the computer 22 as described above, or otherwise. Scans could be performed in sections 14,16,18 and sent sequentially or as a file 20, depending upon the embodiment. Either way, the scan sequence can be uploaded securely at step 202.

A specific anatomy can be denoted at step 204, such as by being pre-identified, or selected by the doctor at the scanner or through computer 22, or even at computer 22 either automatedly or by an operator. Scans of either sections 14,16,18 or files 20 can be segmented at step 206, preferably using a protocol 42 for a specific anatomy. The protocol may include not only assignment of what parts are separate from other parts (or where the cancer is located, if appropriate), but also how to print the anatomy part (such as in halves, quarters, each piece separately, able to be removed from one another, etc.). At step 208, the segmentation can be verified by a human. The applicant has discovered that instead of segmenting individual sections manually as has been done in the prior art by the applicant (taking about 30 minutes after routinely segmenting for over a year), automated segmenting can take less than a minute, or even less than about 30 seconds.

When an image is sequenced by computer 22, specific Hounsfield units can be determined for a least some embodiments. These units can be found and selected (segmented). Software used with the computer 22 can go through each section or image and combine the sections 14,16,18 in to a model for printing as a print 60.

Figure 6:
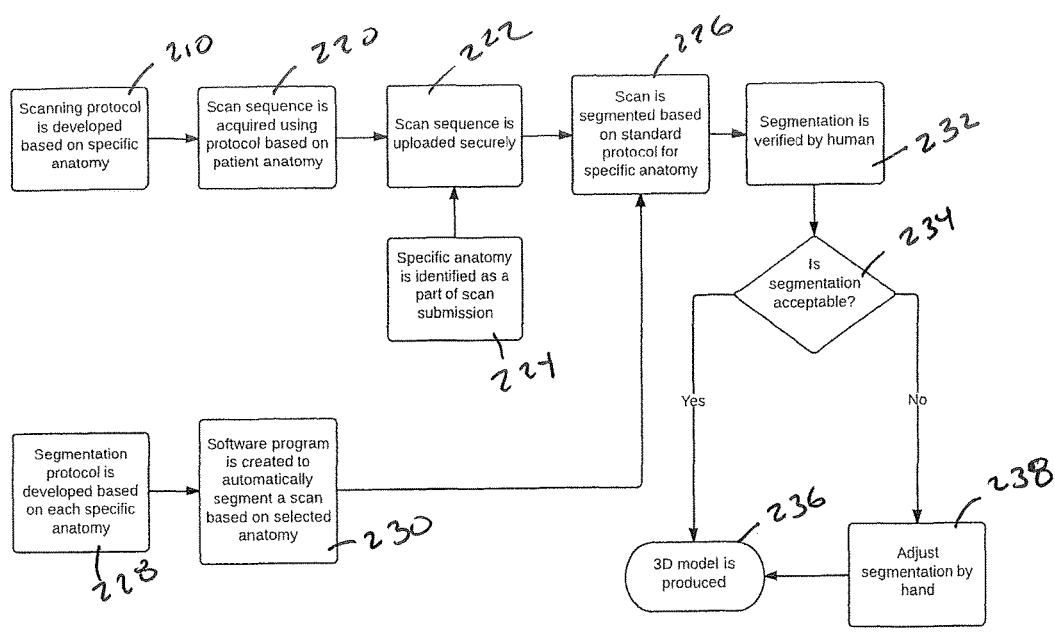
FIG. 6 is a more detailed segmentation process shown in FIG. 5.

FIG. 6 is also useful in that it shows that scanning protocol may be developed for a specific anatomy part 13 (knee illustrated, but could be a brain, a heart, a shoulder, a liver, or any other specific internal part of the body). Different parts may benefit from different scanning protocols provided at step 210. A scan sequence can then be acquired at step 220 (i.e., a scan is taken). The scan (either in total as a file 20 or in sections, 14,16,18, possibly as each one is provided) is then uploaded at step 222 (preferably securely, for at least some embodiments).

The specific anatomy part 13 can be identified as a part of the scan submission 224 or otherwise determined and/or provided as discussed above. The scan can be segmented based on a standard protocol for the specific part 13, such as a knee as illustrated or other body part as discussed herein, or otherwise.

The protocol 42 for segmentation can be developed based on each anatomy and even updated based on the results of each scan (or from at least some scans). The software at the computer 22 can automatedly segment a scan, and possibly assimilate adjacent sections 14,16,18 based on that anatomy at step 230.

Then, in order to save computing time, the protocol can be compared to the uploaded scan for the scan from scanner 11 to be segmented based on the standard protocol 42. This can significantly reduce the time to segment and assimilate over prior art technologies at step 226. The segmentation can then be verified by a human at step 232. If the segmentation is acceptable at step 234, a series of 3D solids (or model) 50,52 can be produced and/or stored at computer 22 and then sent to at least one 3D printer 30,32,34,36 such as described above or otherwise.

If an automated segmentation process is not acceptable at step 234, then at step 238, manual segmentation at step 238 can make changes until an acceptable 3D model is provided at step 236.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. An automated segmentation method for use with two dimensional scans to provide 3 dimensional prints which are scaled models of a three dimensional object, comprising the steps of:
   a) scanning a three dimensional object and receiving a series of two dimensional sections from the scanner;
   b) having a computer automatedly segment the sections sequentially to generate at least one virtual solid;
   c) printing the at least one virtual solid layer by layer with a 3 dimensional printer to provide a three dimensional print being a scaled model representing the three dimensional object;
wherein steps (a) and (b) are performed in an asynchronous production manner whereby sections are sent from the scanner to the computer before completing segmentation of all of the sections for the three dimensional object and the computer outputs the at least one virtual solid for layer by layer printing by the 3 dimensional printer.

2. The method of claim 1 wherein a first section is segmented during the segmentation step and a first solid generated at the computer before beginning segmentation of a second section, with the first solid immediately sent to the 3 dimensional printer before completing segmenting a second solid.

3. The method of claim 1 wherein a first and second section are segmented and assimilated to generate a first solid, said first solid then sent to the 3 dimensional printer for printing to be a portion of the print.

4. The method of claim 3 wherein a second solid is segmented and assimilated from the first and second section, said second solid adjacently disposed in a virtual model of the three dimensional object, and then sending the second solid to the printer for printing to be a portion of the print.

5. The method of claim 3 wherein the first solid is segmented and assimilated from the first section, second section and a third section, and then sending the first solid to the printer for printing to be a portion of the print.

6. The method of claim 2 wherein the first solid is segmented and assimilated from the second section and a third section, said second solid adjacently disposed in a virtual model of the three dimensional object, and then sending the second solid to the printer for printing to be a portion of the print.

7. The method of claim 6 wherein one of the computer and the printer store the second solid until the first solid is printed.

8. The method of claim 1 wherein as the computer receives the sections, the sections are compared to a protocol, said protocol having at least a portion of a segmented solid used to generate the at least one virtual solid.

9. The method of claim 1 wherein the printing occurs at a remote physical location relative to the computer.

10. The method of claim 1 wherein as the computer receives the sections, the sections are compared to a protocol, said protocol having at least a portion of a segmented solid used to generate the at least one virtual solid.

11. The method of claim 10 wherein the protocol comprises an identifier to assist in identifying the scanned object.

12. The method of claim 10 wherein at least one of solids and sections are uploaded to form protocol which is operably coupled to the computer for use in segmenting sections.

13. The method of claim 1 wherein the object is a human anatomy part.

14. The method of claim 13 wherein the scanner is one of a CT scanner, MRI scanner, and PET scanner.

15. The method of claim 14 wherein the 3D print is provided to doctor in less than about an hour after stating the scanning step.

16. The method of claim 15 wherein the 3D print is provided to doctor in less than about half an hour after starting the scanning step.

17. The method of claim 13 wherein the printer is at one of hospital and doctor's office, the computer being remotely located relative thereto, and scan sections are sent as one of sections and series of sections to the computer.

18. The method of claim 13 wherein software operably coupled to the computer identifies the body part being scanned and automatedly segments based on body part.

19. The method of claim 1 further comprising a step of human verification occurs after automated segmentation to review the at least one virtual solid.

* * * * *